United States Patent Office 3,243,432
Patented Mar. 29, 1966

3,243,432
(17-16-c)-STEROIDAL PYRAZOLES AND RELATED INTERMEDIATE PRODUCTS
Pietro de Ruggieri, Carmelo Gandolfi, and Domenico Chiaramonti, Milan, Italy, assignors to Ormonoterapia Richter S.p.A., Milan, Italy, a corporation of Italy
No Drawing. Filed Nov. 7, 1961, Ser. No. 150,665
Claims priority, application Italy, Apr. 28, 1961,
7,936/61, 7,937/61
7 Claims. (Cl. 260—239.55)

The subjects of this invention are the compounds with the following general formula:

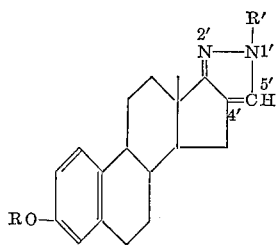

where R represents hydrogen, the methyl group, or the tetrahydropyranyl group; R' represents hydrogen or a lower alkyl radical; and the nitrogen atom in position 2' can be tertiary or quaternary.

As is well known by those experienced in the chemistry of heterocyclic compounds, the invention cannot be limited to the above-mentioned formula. This is due to the fact that the pyrazoles can exist in two tautomeric forms and therefore the migration of the member R' and the displacement of the double bond can occur as indicated below:

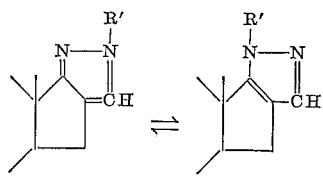

It is therefore intended that claims reciting the structural formula of one tautomeric form of pyrazole be interpreted to cover the corresponding tautomeric form which would necessarily be present Naturally, when the nitrogen atom is quaternary the ring will be in the mesomeric form and thus the quaternary compound will possess the following formula:

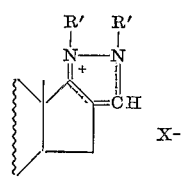

where R' is a lower alkyl radical and X⁻ represents Cl(⁻), Br(⁻), I(⁻). These compounds are completely deprived of the estrogenic activity that is characteristic of the nucleus of the initial product, namely, estrone. Therefore, because of their newly-discovered pharmacological activity, they may be usefully employed therapeutically as hypotensives, lowering the cholesteral in the blood and increasing the fluidity of the blood, and thus they would be useful for the treatment of artheriosclerosis. In addition, they show considerable hypophyseal blocking action; therefore their application to the field of the control of fertility is foreseen, and there are good prospects for their employment in the treatment of neoplasms of the genital system.

As starting materials, the compounds of the general formula:

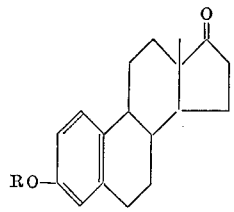

have been employed, where R represents hydrogen, a methyl group, and a tetrahydropyranyl group (the latter was prepared by means of treatment of the estrone with 2,3-dihydropyran in the presence of an acidic catalyst).

These compounds, condensed with ethyl formate in the presence of sodium alcoholate or sodium hydride, form 16-formyl derivatives. By means of treatment of these latter substances with hydrazine or alkyl-hydrazine there are obtained: N-free or N-alkyl-substituted (17,16-c)-pyrazoles of estrone, estrone-3-methyl-ether, and estrone 3-pyranyl-ether.

Further treatment of the N-free or N-alkyl-substituted (17,16-c)-pyrazoles with alkyl halides yields the corresponding alkyl halides. The chlorides and bromides obtained also by means of treatment of the corresponding iodides with silver chloride and bromide.

The following examples serve to illustrate further the invention.

These examples are only illustrative and do not impose any limitations on the invention.

EXAMPLES

*Example 1.—3-(2'-tetrahydropyranyloxy)-estra-1,3,5(10)-triene-17-one*

0.1 part of phosphorous oxychloride is added to a suspension of 5 parts of estra-1,3,5(10)-triene-3-ol-17-one in 20 parts of 2,3-dihydropyran. The contents are heated until dissolution is completed, then they are maintained at room temperature for 4 hours. The contents are diluted with 200 parts of ether, they are washed (in two steps) with 100 parts of a molar solution of sodium bicarbonate, and then they are washed with water until they become neutral. The ether extracts are dried and, after crystallization from ether, 6.2 parts of 3-(2'-tetrahydropyranyloxy) - estra - 1,3,5(10) - triene - 17 - one are obtained, with a melting point of 142–144° C.; $[\alpha]_D = +131°$ (chloroform).

*Example 2.—16-formyl-3(2'-tetrahydropyranyloxy)-estra-1,3,5(10)-triene-17-one*

4 parts of 3-(2'-tetrahydropyranyloxy)-estra-1,3,5(10)-triene-17-one, dissolved in 130 parts of benzene, are treated, in a stream of nitrogen, with 7.5 parts of ethyl formate and 4 parts of sodium hydride. After 5 hours the contents are diluted with 200 parts of ether, and the sodium salt of 16-formyl-3-(2'-tetrahydropyranyloxy)-estra-1,3,5(10)-triene-17-one is obtained by shaking the suspension (in several steps) with a total amount of 300 parts of a 10% solution of monosodium phosphate in water.

The ethero-benzenic extracts are then washed with water until they become neutral; they are dehydrated with sodium sulphate and dried. After grinding in ether, 3.8 parts of 16-formyl-3-(2'-tetrahydropyranyloxy)-estra-1,3,5(10)-triene-17-one were obtained; M.P. 170–172° C.; $[\alpha]_D = +92°$ (chloroform).

*Example 3.—16-formyl-estra-1,3,5(10)-triene-3-ol-17-one*

Operating in a stream of nitrogen, 2 parts of estrone, dissolved in 100 parts of benzene, are treated with 3.75 parts of ethyl formate and 2 parts of sodium hydride. After 5 hours the contents are diluted with petroleum ether, they are filtered, and the sodium salt, after drying under vacuum, is decomposed by means of suspending it in 250 parts of 4 N hydrochloric acid and 200 parts of ice. After crystallization from acetone, 1.4 parts of the product were obtained, with a M.P. of 228–230° C.; $[\alpha]_D = +99°$ (EtOH).

The same product may be obtained also by means of the following method:

1.8 parts of 16-formyl-3-(2'-tetrahydropyranyloxy)-estra-1,3,5(10)-triene-17-one are refluxed for 30 minutes with 80 parts of 4 N HCl. The contents are concentrated and diluted with water, obtaining 1.1 parts of 16-formyl-estra-1,3,5(10)-triene-3-ol-17-one; M.P. 229–231° C.; $[\alpha]_D = +99°$ (EtOH).

*Example 4.—16-formyl-3-methoxy-estra-1,3,5(10)-triene-17-one*

4.4 parts of 3-methoxy-estra-1,3,5(10)-triene-17-one, dissolved in 175 parts of benzene, are treated in a stream of nitrogen, with 10 parts of ethyl formate and 3 parts of sodium hydride. After 5 hours the contents are diluted with 150 parts of petroleum ether, they are filtered, and the sodium salt so obtained is decomposed by means of suspending it in 250 parts of 4 N hydrochloric acid. The crude product is crystallized from acetone, yielding 3.9 parts of 16-formyl-3-methoxy-estra-1,3,5(10)-triene-17-one, with a M.P. of 170–172° C.; $[\alpha]_D = +127°$ (chloroform).

*Example 5.—3-(2'-tetrahydropyranyloxy)-estra-1,3,5(10)-triene-(17,16-c)-pyrazole*

1 part of 16-formyl-3-(2'-tetrahydropyranyloxy)-estra-1,3,5(10)-triene-17-one, dissolved in 10 parts of absolute ethanol, is refluxed for one hour with one part of 85% hydrazine hydroxide. The contents are concentrated under nitrogen, they are filtered, and after crystallization from methanol, 0.85 part of 3-(2'-tetrahydropyranyloxy)-estra-1,3,5(10)-triene-(17,16-c)-pyrazole are obtained, with a M.P. of 128–131° C.; $[\alpha]_D = +3.5°$ (chloroform).

*Example 6.—3-(2'-tetrahydropyranyloxy)-estra-1,3,5(10)-triene-(17,16-c)-(2''-methyl)-pyrazole*

1 part of 16-formyl-3-(2'-tetrahydropyranyloxy)-estra-1,3,5(10)-triene-17-one, in 15 parts of ethanol, is refluxed for 1 hour with 10 parts of ethanol containing 0.30 part of methylhydrazine. The contents are concentrated under nitrogen and they are filtered, obtaining 0.83 part of 3-(2'-tetrahydropyranyloxy)-estra-1,3,5(10)-triene-(17,16-c)-(2''-methyl)-pyrazole; M.P. 198–202° C.; $[\alpha]_D = +2.4°$ (chloroform).

*Example 7.—Estra-1,3,5(10)-triene-3-ol-(17,16-c)-pyrazole*

0.35 part of 16-formyl-estra-1,3,5(10)-triene-3-ol-17-one, dissolved in 5 parts of ethanol, are refluxed for 1 hour with 0.5 part of 85% hydrazine hydroxide. The contents are concentrated and diluted with water, and 0.35 part of the product are obtained, with a M.P. of 292–294° C.; $[\alpha]_D = +95°$ (EtOH).

The same product may be obtained also by means of the following method:

0.3 parts of 3-(2'-tetrahydropyranyloxy)-estra-1,3,5-(10)-triene-(17,15-c)-pyrazole are refluxed for 30 minutes with 10 parts of methanol and 6 parts of 3 N HCl. The contents are concentrated, neutralized, diluted with water, and filtered, obtaining 0.2 part of the product (M.P. 287–290° C.), which, after crystallization from methanol, has a M.P. of 291–293° C., which is not lowered when there is a mixture of the latter product with the product previously obtained.

*Example 8.—Estra-1,3,5(10)-triene-3-ol-(17,16-c)-(2'methyl)-pyrazole*

1 part of 16-formyl-estra-1,3,5(10)-triene-3-ol-17-one, in 15 parts of ethanol, is refluxed for 1 hour with a solution of 0.30 part of methylhydrazine in 10 parts of ethanol. The contents are concentrated under nitrogen, they are filtered, and 0.7 part of estra-1,3,5(10)-triene-3-ol-(17,16-c)-(2'-methyl)-pyrazole are obtained, with a M.P. of 305–307° C.; $[\alpha]_D = +78.5°$ (pyridine).

The same product may be obtained also by means of the following method:

1.3 parts of 3-(2'-tetrahydropyranyloxy)-estra-1,3,5 (10)-triene-(17,16-c)-(2'-methyl)-pyrazole are refluxed for 30 minutes with 10 parts of methanol and 6 parts of 3 N hydrochloric acid. The contents are concentrated, neutralized, diluted with water, and filtered, obtaining 0.8 part of the product, with a M.P. of 302–305° C.; $[\alpha]_D = +78°$ (pyridine).

*Example 9.—3-methoxy-estra-1,3,5(10)-triene-(17,16-c)-pyrazole*

1.5 parts of 16-formyl-3-methoxy-estra-1,3,5(10)-triene-17-one are refluxed for 1 hour with 30 parts of absolute ethanol and 1.5 parts of 85% hydrazine hydroxide. The contents are concentrated under nitrogen and diluted with water, and 1.4 parts of the crude product are obtained, with a M.P. of 140–143° C., which, after crystallization from sulphuric ether, has a M.P. of 147–149° C.; $[\alpha]_D = +110°$ (chloroform).

*Example 10.—3-methoxy-estra-1,3,5(10)-triene-(17,16-c)-(2'-methyl)-pyrazole*

1 part of 16-formyl-3-methoxy-estra-1,3,5(10)-triene-17-one, dissolved in 10 parts of absolute ethanol, is refluxed for 1 hour with 10 parts of absolute ethanol containing 0.3 part of methyl-hydrazine. The contents are concentrated under nitrogen and filtered, and, after crystallization from acetone, 0.85 part of 3-methoxy-estra-1,3,5(10)-triene-(17,16-c)-(2'-methyl)-pyrazole are obtained, with a M.P. of 163–165° C.; $[\alpha]_D = +90°$ (chloroform).

*Example 11.—3-(2'-tetrahydropyranyloxy)-estra-1,3,5(10)-triene-(17,16-c)-(1'',2''-dimethyl)-pyrazolinium-iodide*

1 part of 3-(2'-tetrahydropyranyloxy)-estra-1,3,5(10)-triene-(17,16-c)-(2''-methyl)-pyrazole, dissolved in 20 parts of anhydrous benzene, is refluxed for 4 hours with 10 parts of methyl iodide. The contents are filtered and 1.20 parts of 3-(2'-tetrahydropyranyloxy)-estra-1,3,5-(10)-triene-(17,16-c)-(1'',2''-dimethyl)-pyrazolinium-iodide are obtained, with a M.P. of 280–285° C. which, recrystallized from water, yields 1.05 parts of the product, with a M.P. of 294–296° C.

*Example 12.—Estra-1,3,5(10)-triene-ol-(17,16-c)-(1',2'-dimethyl)-pyrazolinium-iodide*

0.35 part of estra-1,3,5(10)-triene-3-ol-(17,16-c)-pyrazole, dissolved in 40 parts of acetone, are refluxed for 4 hours with 5 parts of methyl iodide. The contents are filtered and the crude product is recrystallized from water in order to obtain 0.12 part of estra-1,3,5(10)-triene-3-ol-(17,16-c)-(1',2'-dimethyl)-pyrazolinium-iodide, with a M.P. of 305–308° C.

The same product may be obtained also by means of the following method:

1 part of estra-1,3,5(10)-triene-3-ol-(17,16-c)-(2'-methyl)-pyrazole, dissolved in 200 parts of acetone, is refluxed with 30 parts of methyl iodide for 7 hours. The contents are filtered and crystallized from water, obtaining 1.1 parts of estra-1,3,5(10)-triene-3-ol-(17,16-c)-(1', 2'-dimethyl)-pyrazolinium-iodide, with a M.P. of 306–308° C.

*Example 13.—3 - methoxy-estra-1,3,5(10)-triene-(17,16-c)-(1',2'-dimethyl)-pyrazolinium-iodide*

4.2 parts of 3-methoxy-estra-1,3,5(10)-triene-(17,16-c)-(2'-methyl)-pyrazole, dissolved in 85 parts of benzene, are refluxed for 6 hours with 35 parts of methyl iodide. The contents are filtered, obtaining 5.6 parts of the crude product (M.P. 250–252° C.) which, after crystallization from water, yields 5.2 parts of 3-methoxy-estra-1,3,5(10)-triene - (17,16-c) - (1',2'-dimethyl)-pyrazolinium-iodide, with a M.P. of 252–254° C.

The same product may be obtained also by means of the following method:

1.2 parts of 3-methoxy-estra-1,3,5(10)-triene-(17,16-c)-pyrazole, dissolved in 40 parts of benzene, are refluxed with 15 parts of methyl iodide for 6 hours. The contents are filtered, and the crude product obtained after crystallization from water yields 0.7 part of 3-methoxy-estra - 1,3,5(10)-triene-(17,16-c)-(1',2'-dimethyl)-pyrazolinium-iodide, with a M.P. of 252–254° C.

*Example 14.—3 - methoxy-estra-1,3,5(10)-triene-(17,16-c)-(1',2'-dimethyl)-pyrazolinium-bromide*

1 part of 3-methoxy-estra-1,3,5(10)-triene-(17,16-c)-(1',2'-dimethyl)-pyrazolinium-iodide, dissolved in 60 parts of methanol and 18 parts of water, is shaken for 10 hours with 2.5 parts of silver bromide. The contents are filtered, dried, and crystallized from acetone, obtaining 0.75 part of 3-methoxy-estra-1,3,5(10)-triene-(17,16-c)-(1',2'-dimethyl)-pyrazolinium-bromide, with a M.P. of 243–245° C.

The same product may be obtained also by means of the following method:

0.4 part of 3-methoxy-estra-1,3,5(10)-triene-(17,16-c) pyrazole, dissolved in 10 parts of benzene, are refluxed for 10 hours in a stream of methyl bromide. The contents are cooled, the formed precipitate is filtered, which, after crystallization from water and acetone, yields 0.08 part of 3-methoxy-estra-1,3,5(10)-triene-(17,16-c)-(1',2'-dimethyl)-pyrazolinium-bromide, with a M.P. of 240–244° C.

*Example 15.—3 - methoxy - estra - 1,3,5(10)-triene-(17,16-c)-(1',2'-dimethyl)-pyrazolinium-chloride*

0.3 part of 3-methoxy-estra-1,3,5(10)-triene-(17,16-c)-(1',2'-dimethyl)-pyrazolinium-iodide, dissolved in 15 parts of methanol and 5 parts of water, is shaken for 10 hours with 0.9 part of silver chloride. The contents are filtered, dried, and crystallized from acetone, obtaining 0.2 part of 3 - methoxy-estra-1,3,5(10)-triene-(17,16-c)-(1',2'-dimethyl)-pyrazolinium-chloride, with a M.P. of 241–242.5° C.

*Example 16.—3 - methoxy - estra - 1,3,5(10) - triene-(17,16-c)-(1'-ethyl-2'-methyl)-pyrazolinium-bromide*

0.5 part of 3-methoxy-estra-1,3,5(10)-triene-(17,16-c)-(2'-methyl)-pyrazole, dissolved in 15 parts of xylene (boiling point 137–140° C.), are refluxed with 10 parts of ethyl bromide. The contents are filtered and crystallized from water and acetone, obtaining 0.2 parts of 3-methoxy-estra - 1,3,5(10) - triene - (17,16-c)-(1'-ethyl-2'-methyl)-pyrazolinium-bromide, with a M.P. of 229–231° C.

We claim:
1. A compound selected from the group consisting of a compound of the formula

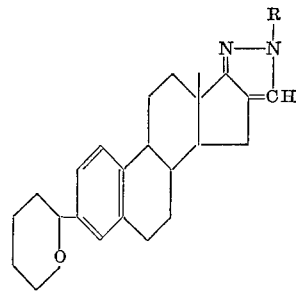

where R is selected from the group consisting of hydrogen and lower alkyl; and a 2'-quaternary derivative thereof.

2. A compound of the formula

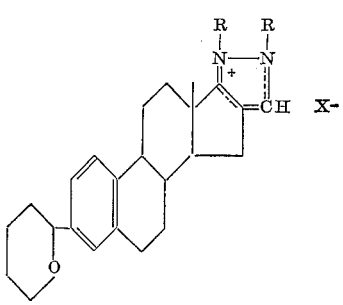

where R is lower alkyl and X is selected from the group consisting of chlorine, bromine and iodine ions.

3. 3 - (2'-tetrahydropyranyloxy)-estra-1,3,5(10)-triene-(17,16-c)-pyrazole.

4. 3 - (2'-tetrahydropyranyloxy)-estra-1,3,5(10)-triene-(17,16-c)-(2"-methyl)-pyrazole.

5. 3 - (2'-tetrahydropyranyloxy)-estra-1,3,5(10)-triene (17,16-c)-(1",2"-dimethyl)-pyrazolinium-iodide.

6. 3 - (2'-tetrahydropyranyloxy)-estra-1,3,5(10)-triene-17-one.

7. 16 - formyl - 3 - (2' - tetrahydropyranyloxy)-estra-1,3,5(10)-triene-17-one.

References Cited by the Examiner

UNITED STATES PATENTS 2,937,168    5/1960    Dodson _____ 260—239.5

LEWIS GOTTS, *Primary Examiner.*

M. LIEBMAN, *Examiner.*

H. A. FRENCH, *Assistant Examiner.*